US007050375B2

United States Patent
Geo

(10) Patent No.: US 7,050,375 B2
(45) Date of Patent: May 23, 2006

(54) APPARATUS FOR AND METHOD OF GENERATING OPTICAL RECORDING PULSE

(75) Inventor: Jin gyo Geo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 456 days.

(21) Appl. No.: 10/076,561

(22) Filed: Feb. 19, 2002

(65) Prior Publication Data

US 2002/0114246 A1 Aug. 22, 2002

(30) Foreign Application Priority Data

Feb. 19, 2001 (KR) .................... 2001-8136

(51) Int. Cl.
G11B 7/125 (2006.01)
G11B 7/004 (2006.01)

(52) U.S. Cl. .................. 369/53.11; 369/53.12

(58) Field of Classification Search ............ 369/59.11, 369/53.2, 59.14, 53.12, 53.11, 59.4; G11B 7/00
See application file for complete search history.

(56) References Cited

U.S. PATENT DOCUMENTS 5,757,735 A    5/1998  Fitzpatrick et al.
6,222,814 B1*  4/2001  Ichimura ............... 369/116
6,459,666 B1* 10/2002  Yokoi ................... 369/47.15
6,480,450 B1* 11/2002  Fujii et al. ............ 369/59.12
6,483,791 B1* 11/2002  Asada et al. ........... 369/59.11
6,757,232 B1*  6/2004  Yamada et al. ......... 369/59.12
6,762,986 B1*  7/2004  Seo ..................... 369/59.12

FOREIGN PATENT DOCUMENTS

| EP | 0 388 897    |  9/1990 |
| EP | 0 978 827 A2 |  2/2000 |
| EP | 1 045 378    | 10/2000 |
| EP | 1 058 240    | 12/2000 |
| EP | 0 978 827 A3 |  1/2001 |
| JP | 6-309720     | 11/1994 |
| JP | 11-312311    | 11/1999 |
| JP | 2000-215449  |  8/2000 |
| WO | 99/52103     | 10/1999 |

OTHER PUBLICATIONS

Two English Abstracts of JP 2000-215449 A2.

* cited by examiner

*Primary Examiner*—A M Psitos
(74) *Attorney, Agent, or Firm*—Staas & Halsey LLP

(57) ABSTRACT

An apparatus for and a method of generating an optical recording pulse having multi-pulse patterns suitable for a high-density and high-speed optical medium are provided. The apparatus for generating the optical recording pulse having a multi-pulse chain includes a recording pulse generator generating the optical recording pulse and a controller connected to the recording pulse generator controlling the recording pulse generator so that according to the type of an optical medium or a recording speed of the optical medium, there can exist at least two different widths in respective pulses of the multi-pulse to form a mark on the optical medium.

47 Claims, 6 Drawing Sheets

FIG. 2A NRZI
FIG. 2B
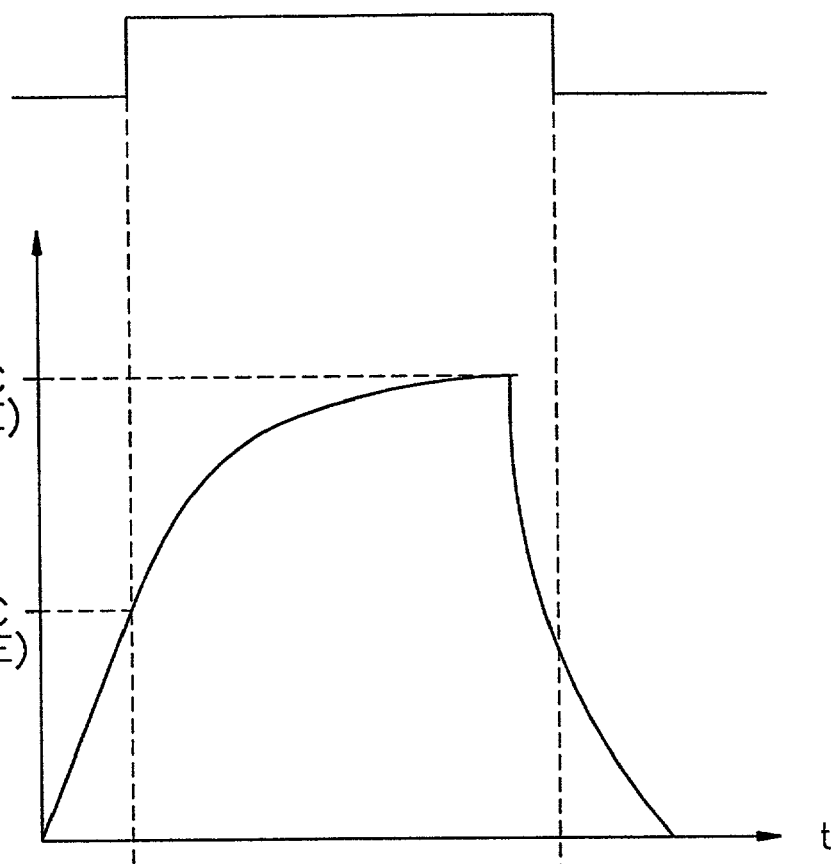
FIG. 2C
FIG. 2D
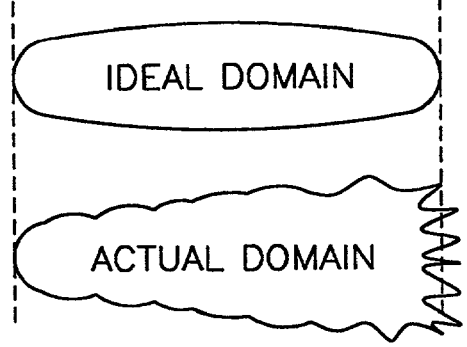

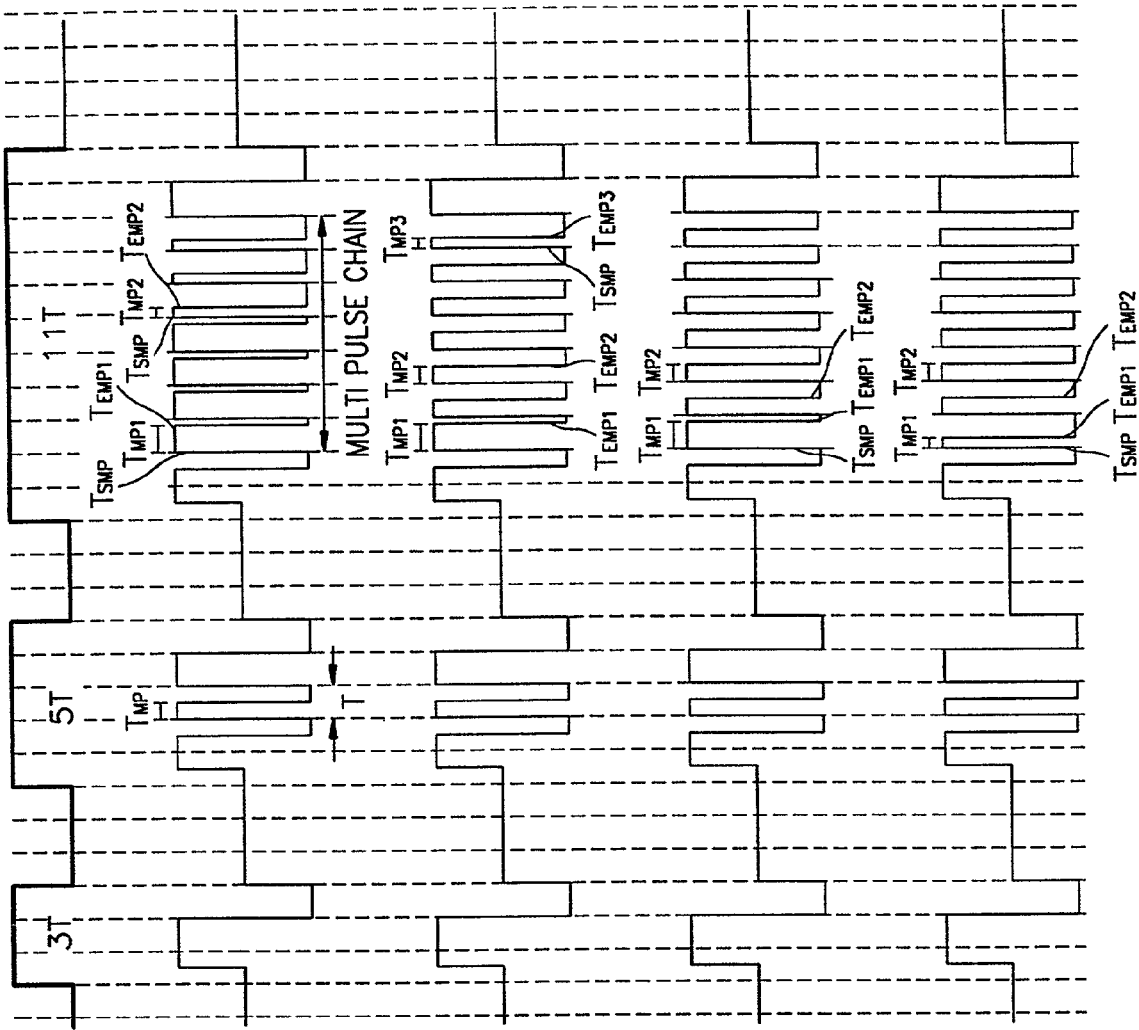

FIG. 5A NRZI
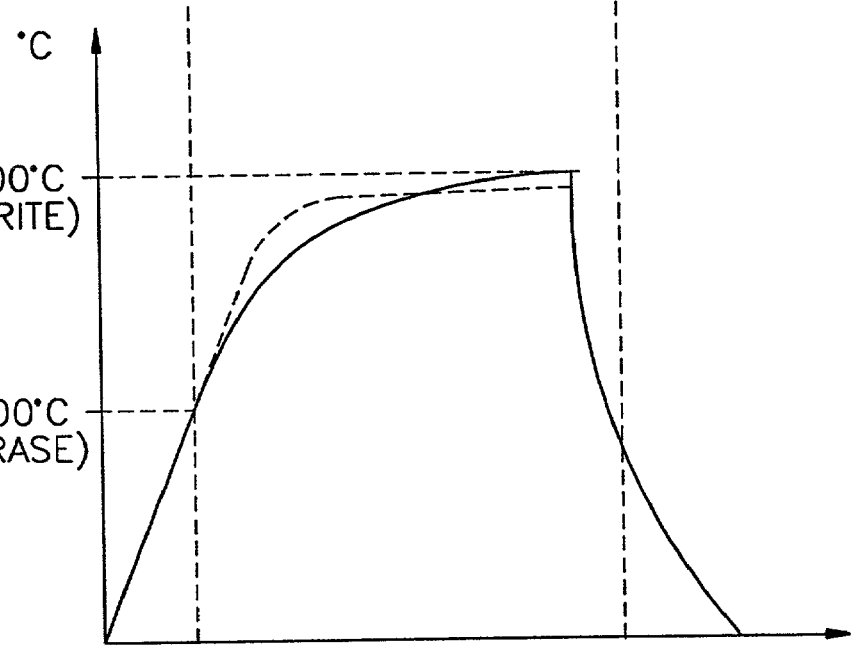
FIG. 5B
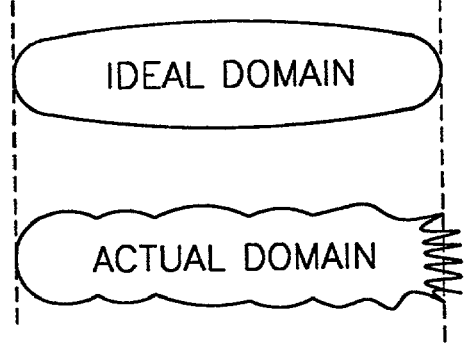
FIG. 5C IDEAL DOMAIN
FIG. 5D ACTUAL DOMAIN

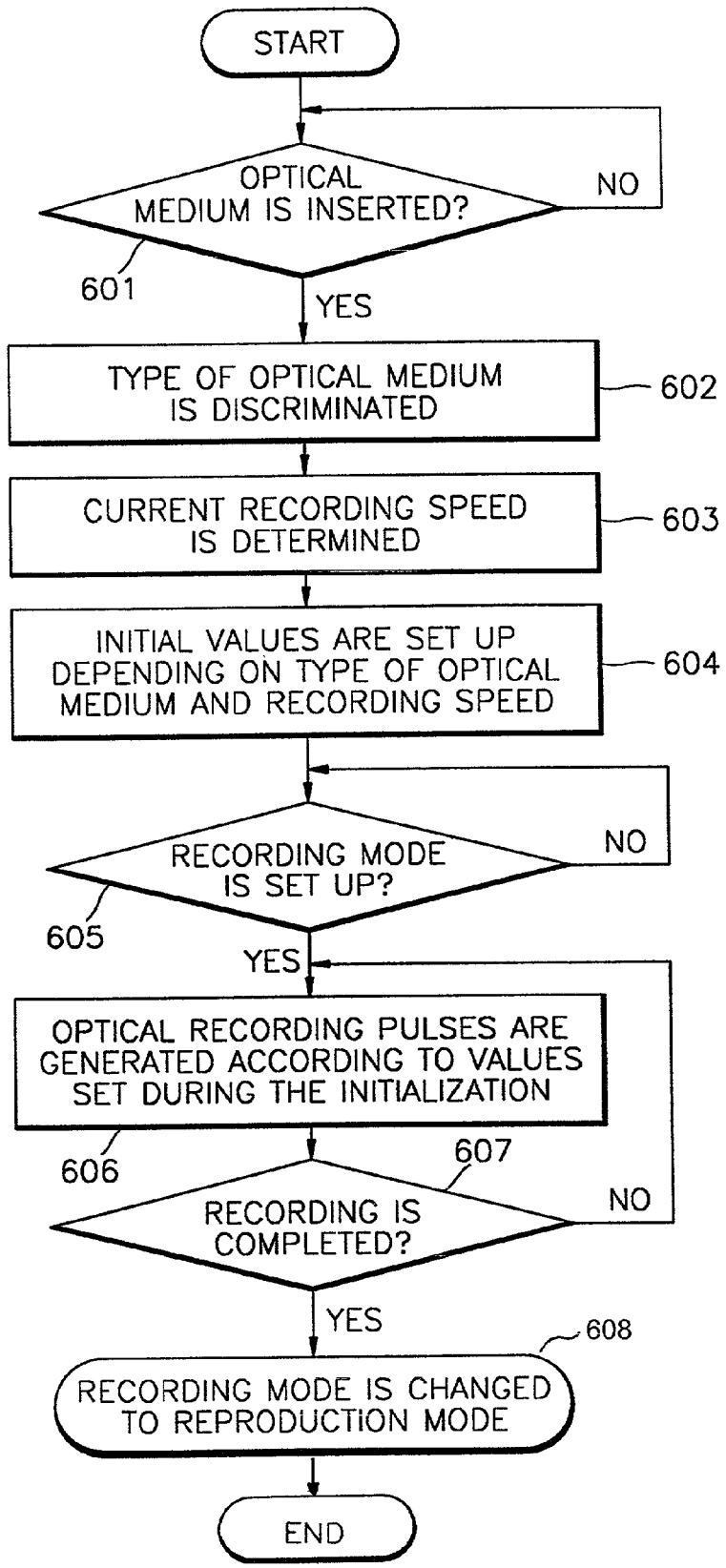

APPARATUS FOR AND METHOD OF GENERATING OPTICAL RECORDING PULSE

CROSS-REFERENCE TO RELATED APPLICATIONS

This application claims the benefit of Korean Application N0. 2001-8136, filed Feb. 19, 2001, in the Korean Industrial Property Office, the disclosure of which is incorporated herein by reference.

BACKGROUND OF THE INVENTION

1. Field of the Invention

The present invention relates to an apparatus for and a method of generating an optical recording pulse, and more particularly, to an apparatus for and a method of generating an optical recording pulse having multi-pulse patterns suitable for a high-density and high-speed optical medium.

2. Description of the Related Art

An optical recording pulse having multi-pulse patterns is designed to overcome the disadvantages of a mark edge recording method that enables recording signals to be recorded on an optical medium with high recording density. A mark is formed on the optical medium in response to the recording signals. If the mark is long enough to have a high thermal density when the recoding signals are recorded on the optical medium using the mark edge recording method, the high thermal density causes a trailing edge of the mark to have a width greater than a leading edge of the mark. The widened trailing edge of the mark results in degradation of the optical recording signals recorded on the optical medium when the optical recording signals are reproduced from the optical medium. As a solution to the problem, the optical recording pulse having multi-pulse patterns is suggested. The optical recording pulse corresponding to the recording signal includes multi-pulse chains or multi-pulse trains (hereinafter referred to multi-pulse).

The optical recording pulse having multi-pulse patterns is generated as shown in FIG. 1B when Non Return to Zero Inverted (NRZI) data of FIG. 1A is inputted. As shown in FIG. 1B, the optical recording pulse having the multi-pulse patterns has three levels, that is, a recording power level, an erase power level, and a bias power level. The optical recording pulse having the multi-pulse patterns includes an erase pulse, a first pulse, a multi-pulse, a last pulse, and a cooling pulse.

FIG. 1B shows a bottom bias power level. However, a basic bias power level corresponding to an erase power level shown in FIG. 1B or an intermediate bias power level which is between the erase power level and a bias power level may be provided for a stable recording operation. If the basic and intermediate power levels in addition to the bottom-level bias power are also considered as bias power levels, the number of the bias power levels would be 3.

The erase pulse having the erase power level is used to erase a previous record or perform pre-heating before a recording signal is recorded . The first pulse has the recording power level and is designed to create the leading edge of a recording mark. With regard to a long mark, the multi-pulse is designed to reduce the unevenness of the domain, which may be caused by the thermal density. If the optical medium is a DVD-RAM or a DVD-R, the multi-pulse is inserted into the optical recording pulse having a length of 5T of the NRZI. If the optical medium is a DVD-RW or a CD-RW, the multi-pulse is inserted into the optical recording pulse having a length of 4T of NRZI. T designates a predetermined clock period for the optical recording signal.

The multi-pulse is inserted between the first pulse and the last pulse when the mark is created. The pulses of the multi-pulse alternate between the bottom bias power level and the recording power level. The number of pulses in the multi-pulse is determined based on the length of the recording mark. For example, in the case of a DVD-RAM or a DVD-R, the number of the pulses of the multi-pulse is obtained from a value corresponding to the length of 4T of the NRZI. In the case of a DVD-RW or a CD-RW, the number of the pulses of the multi-pulse is obtained from a value corresponding to the length of 3T of the NRZI.

The last pulse is used to create the trailing edge of the recording mark and has the recording power level. The cooling pulse has the bias power level, and is used to prevent the recording mark from being formed too long and being distorted. Therefore, in a cooling pulse section, a laser power is turned off in accordance with the cooling pulse. The bias power level attained by the cooling pulse can be the basic bias power level corresponding to the erase power level, the bottom bias power level, or the intermediate bias power level between the erase power level and the bottom level.

However, when the optical medium is initialized, the width ($T_{MP}$) of the multi-pulse has a fixed value as shown in 11T of FIG. 1B. Therefore, there is a limit in obtaining an ideal domain configuration of the mark formed on the optical medium.

To record the NRZI data shown in FIG. 2A on a phase-transformation optical medium, the optical recording pulse having multi-pulse patterns are inputted to a laser diode (LD) unit. The LD unit determines a power level based on the input pulse and heats a recording film of the optical medium. As shown in FIG. 2B, the recording film of the optical medium is in an erase state around 300° C. and in a liquid state or a melting state if the temperature of the recording film rises above 600° C. Then, the cooling speed of the recording film is adjusted so that a desired mark can be formed. Lowering or turning off the power of the laser beam in response to the cooling pulse may effectively cool the recording film. In FIG. 2B, a horizontal axis indicates time, and a vertical axis indicates the temperature of the recording film of the optical medium.

A domain is created on the recording film of the optical medium by a recording procedure as shown in FIG. 2B. The created domain configuration is shown in FIG. 2D. FIG. 2D shows that the leading edge and the trailing edge of the mark on the domain are uneven and unlike the ideal domain configuration shown in FIG. 2C.

The domain corresponds to the mark or a pit formed on the optical medium. Therefore, unless the first, middle, and last portions of the domain configuration are formed evenly and smoothly, jitter increases, and cross erasure of a gap between adjacent tracks occurs. Moreover, cross talk is generated between adjacent tracks during reproduction of the optical recording pulse. The above problems are more serious for a high-density and high-speed optical medium or a land/groove structure optical medium.

SUMMARY OF THE INVENTION

To solve the above problems, it is an object of the present invention to provide an apparatus for and a method of generating an optical recording pulse having multi-pulse patterns suitable for a high-density, high-speed optical medium.

It is another object of the present invention to provide an apparatus for and a method of generating an optical recording pulse having multi-pulse patterns, wherein each width of the pulses of a multi-pulse chain is set to be variable depending on the type of the optical medium, the recording speed, or a constant angular velocity (CAV) recording process.

Additional objects and advantages of the invention will be set force in part in the description which follows and, in part, will be obvious from the description, or may be learned by practice of the invention.

To achieve the above and other objects, an apparatus is provided for generating an optical recording pulse having a first pulse, a multi-pulse chain having a plurality of patterns, and a last pulse according to the present invention, the apparatus including a recording pulse generator generating an optical recording pulse and a controller controlling the recording pulse generator so that the recording pulse has pulses of the multi-pulse chain having at least two different widths to create one mark according to the type of the optical medium or the set recording speed.

In addition, the controller determines whether the pulses having at least two different widths should exist on the multi-pulse chain of the optical recording pulse. Moreover, it is preferable that the controller determines the widths of the multi-pulse chain in response to the type of the optical medium, the recording speed, and the CAV recording process during the initialization of a recording process.

To achieve the above and other objects, a method is provided of generating an optical recording pulse having a first pulse, a last pulse, and a multi-pulse chain having a plurality of patterns, and a last pulse according to the present invention. The method includes setting a recording mode so that at least two different widths of the multi-pulse chain are used to create one mark depending on the type of an optical medium or the recording speed, and generating an optical recording pulse according to the set widths of the respective pulses of the multi-pulse chain.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 2A through 2D are examples showing recording characteristics of an optical medium when the optical recording pulse of FIG. 2B is used for forming a mark;

FIGS. 4A through 4E show examples of waveforms of the optical recording pulse generated according to an embodiment of the present invention;

FIGS. 5A, 5B, 5C, and 5D are examples showing recording characteristics of the optical medium according to the present invention; and FIG. 6 is a flowchart describing an optical recording pulse generation method according to an embodiment of the present invention.

DETAILED DESCRIPTION OF THE PREFERRED EMBODIMENTS

Figures 1A, 1B:
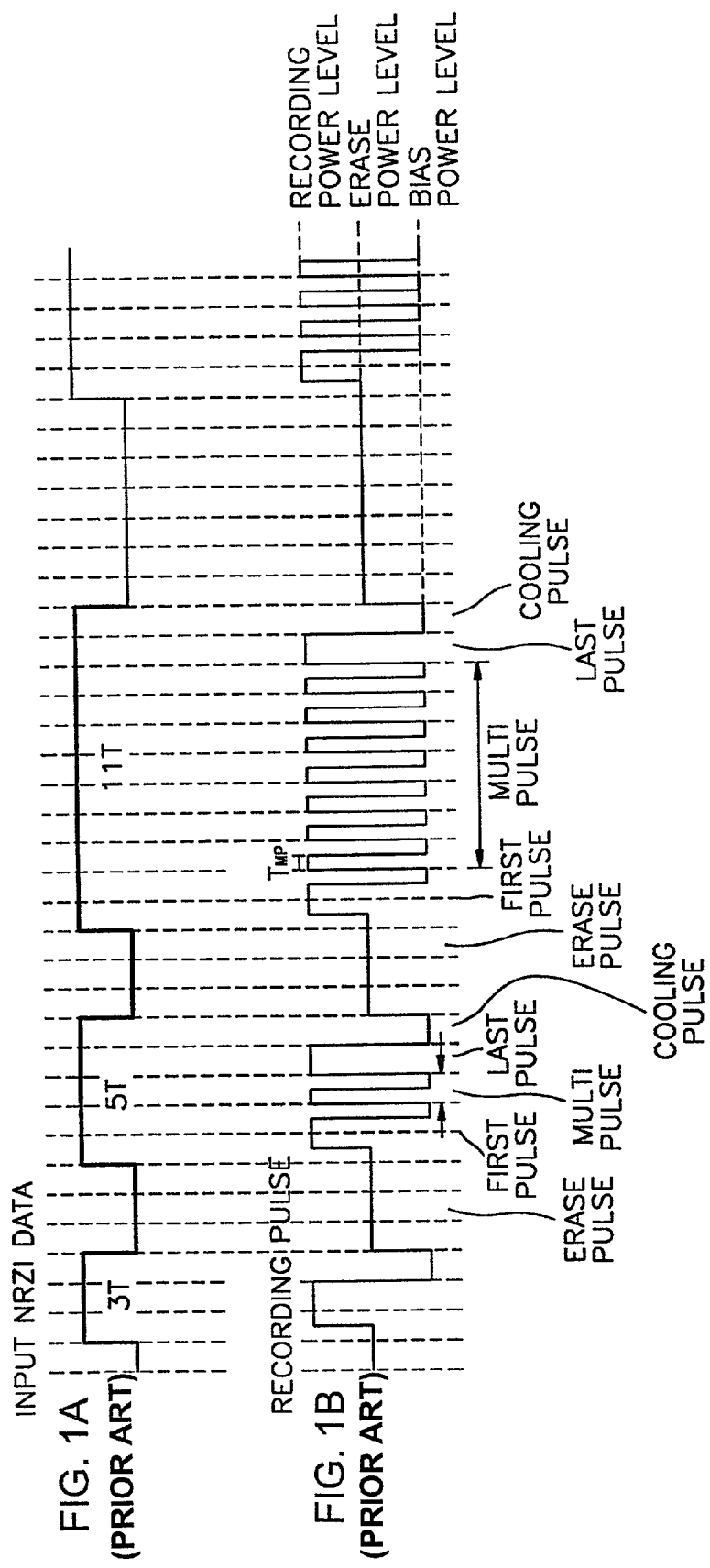
FIGS. 1A and 1B are waveform diagrams of an optical recording pulse having multi-pulse patterns.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
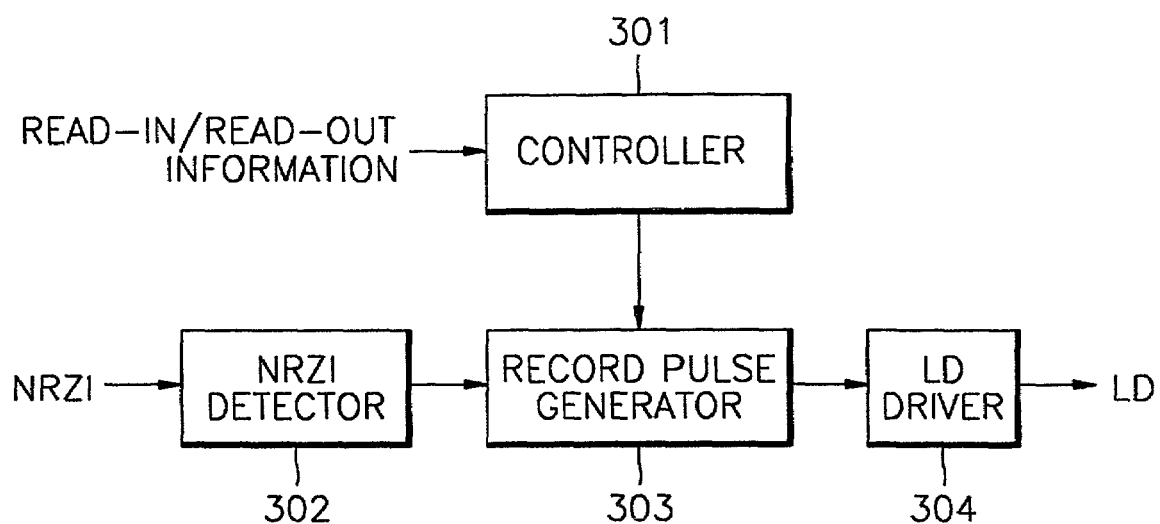
FIG. 3 is a block diagram of an optical recording pulse generating apparatus constructed according to an embodiment of the present invention.

Referring to FIG. 3, an optical recording pulse generating apparatus constructed according to the present invention includes a controller 301, a Non Return to Zero Inverted (NRZI) detector 302, a recording pulse generator 303 and a Laser Diode (LD) driver 304.

If an optical medium is inserted into an optical recording apparatus, the controller 301 identifies the type of the optical medium by reading information from a lead-in area and a lead-out area of the optical medium. The type of the optical medium can be identified through a recording speed and the type of a recording pulse. For example, if different recording pulses are generated depending on whether a DVD-RAM, DVD-R, DVD-RW, DVD+RW or CD-RW is inserted, the controller 301 identifies whether the optical medium is one of a DVD-RAM, DVD-R, DVD-RW, DVD+RW and CD-RW. However, in the case where the recording pulses are generated according to a manufacturer's specification or other detailed conditions, the type of the optical medium can be identified through the detailed conditions. The controller 301 determines a recording speed suitable for the type of the optical medium identified through the detailed conditions.

After the controller 301 identifies the type of the optical medium and determines the recording speed, the controller 301 generates initial values used for initiating a recording and reproducing function on the optical medium. The initial values include values corresponding to the multi-pulse patterns of the optical recording pulse. In particular, the controller 301 determines the respective widths ($T_{MP}$) of the pulses of the multi-pulse depending on the type of the optical medium, the recording speed, and the CAV recording process.

In this case, the controller 301 sets the width ($T_{MP}$) of each pulse of the multi-pulse to a fixed value or to at least two different values. In the case where at least two different values are set as the widths of the multi-pulse, the controller 301 determines how two different widths should be assigned to respective pulses of the multi-pulse. Pulses having the same width can form a width set. One pulse may also form a width set.

For example, it is assumed that the widths of the first four pulses of the multi-pulse chain are larger than a pre-fixed value, and the widths of the remaining pulses of the multi-pulse chain are smaller than the pre-fixed value. In this case, if the NRZI data shown in FIG. 4A is input, the optical recording pulse is generated according to an embodiment of FIG. 4B. The first four pulses of the multi-pulse chain have widths ($T_{MP1}$) larger than the pre-fixed value. The remaining pulses of the multi-pulse chain, however, have widths ($T_{MP2}$) smaller than the pre-fixed value.

In addition, it is assumed that the width of an initial pulse within the multi-pulse chain is greater than the pre-fixed value, the width of an ending pulse of the multi-pulse chain is less than the pre-fixed value, and the widths of middle pulses between the initial pulse and the ending pulse of the multi-pulse chain are set to be the pre-fixed values. In this case, if the NRZI data shown in FIG. 4A is input, the optical recording pulse according to another embodiment of FIG. 4C is generated. That is, as shown in FIG. 4C, the initial pulse of the multi-pulse chain has a width ($T_{MP1}$) larger than the pre-fixed value, the ending pulse of the multi-pulse chain has a width ($T_{MP3}$) narrower than the pre-fixed value, and the middle pulses between the initial pulse and the ending pulse of the multi-pulse chain have a width ($T_{MP2}$) which is the same as the pre-fixed value. In FIG. 4C, the pulse having a ($T_{MP1}$) width may form one width set and the pulse having a width ($T_{MP3}$) may form another width set. The pulses having a width ($T_{MP2}$) may form yet another width set.

In another case, it is assumed that the width ($T_{MP}$) of the initial pulse within the multi-pulse chain is larger than the pre-fixed value, and the widths ($T_{MP}$) of the remaining pulses are the same as the pre-fixed value. In this case, if the NRZI data shown in FIG. 4A is input, the optical recording pulse according to another embodiment of FIG. 4D is generated. That is, as shown in FIG. 4D, the initial pulse of the multi-pulse chain has a width ($T_{MP1}$) greater than the pre-fixed value, and the remaining pulses of the multi-pulse chain have widths ($T_{MP2}$) the same as the pre-fixed value.

In addition, it is assumed that the width of the initial pulse within the multi-pulse chain is smaller than the pre-fixed value, and the widths of the remaining pulses are the same as the pre-fixed value. In this case, if the NRZI data shown in FIG. 4A is input, the optical recording pulse according to another embodiment of FIG. 4E is generated. That is, as shown in FIG. 4E, the initial pulse of the multi-pulse chain has a width ($T_{MP1}$) smaller than the pre-fixed value, and the remaining pulses of the multi-pulse chian have widths ($T_{MP2}$) the same as the pre-fixed value.

Besides the cases illustrated in FIGS. 4A through 4E, the multi-pulse chain can be divided into a first part and a second part. In the first and second parts, the widths of the pulses of the multi-pulse chain can be set to be different from each other.

As described above, if the width ($T_{MP}$) of the pulse of the multi-pulse chain is set to be variable, the variable pulses of the multi-pulse chain should not exceed a predetermined range of the multi-pulse chain of the optical recording pulse. That is, although the width of the respective pulses of the multi-pulse chain varies, and the total period of the multi-pulse chain and the number of the pluses of the multi-pulse chain in the optical recording pulse are maintained.

Moreover, the pulse width ($T_{MP}$) within the multi-pulse chain should be set in such a way that the configuration of the domain created on the optical medium will be nearly close to the ideal configuration as shown in FIG. 5C in all cases.

In response to the NRZI data as shown in FIG. 5A, the width ($T_{MP}$) of the pulses of the multi-pulse chain is determined in such a way that the NRZI data of FIG. 5A may have the recording characteristics illustrated by the dot lines of FIG. 5B. Regardless of the optical medium used, the actual domain, as shown in FIG. 5D, should have a configuration close to that of the ideal domain of FIG. 5C.

During setup of initial values, the controller 301 may change each starting value (Tsmp) for the pulses of the multi-pulse chain or each ending value ($T_{EMP}$) of the pulses of the multi-pulse in order to adjust the width of the pulses of the multi-pulse chain. For example, in FIG. 4, the controller determines widths $T_{MP1}$, $T_{MP2}$, and $T_{MP3}$ and the ending values $T_{EMP1}$, $T_{EMP2}$, and $T_{EMP3}$ of the pulses of the multi-pulse chain.

When the NRZI detector 302 receives the NRZI data, the NRZI detector 302 detects the type of data to be recorded. That is, the NRZI detector 302 detects the relation between the current mark and the space, and the sizes of the current mark or the space depending on the size of spaces before and after the current mark. Then, the detector 302 provides the detected results to the recording pulse generator 303.

The recording pulse generator 303 generates an optical recording pulse corresponding to the detected results provided by the NRZI detector 302 and the initial values of the optical recording pulse provided by the controller 301. That is, the recording pulse generator 303 generates the optical recording pulse having any of the forms shown in embodiment of FIGS. 4B through 4E depending on the initial values provided by the controller 301.

The LD driver 304 operates the LD (not shown) according to the recording pulse provided by the recording pulse generator 303.

FIG. 6 is a flowchart of the optical recording pulse generation method according to the present invention.

If it is determined that an optical medium is inserted in operation 601, the type of optical medium is discriminated in operation 602. The discrimination criteria are the same as those of the controller 301. Then, in operation 603, the current recording speed is determined. The recording speed can be user-defined or predetermined.

In operation 604, initial values are set up depending on the type of optical medium and the recording speed. In this case, the values of the pulses included in the multi-pulse patterns of the optical recording pulse are also set up. In particular, as described above, the controller 301 can set each width of the pulses within the multi-pulse chain as one value or at least two different values. In the operation, where the one value or the two different values should be assigned within the multi-pulse chain is determined. For example, as shown in FIGS. 4B through 4E, it is determined that the width of the first N pulses of the multi-pulse chain is set to be $T_{MP1}$ while that of the remaining pulses of the multi-pulse chain is set to be $T_{MP2}$ within the multi-pulse chain, and it is determined widths of the respective pulses of the multi-pulse chain can be arranged in order.

If the initial values and the recording mode are set up completely, the optical recording pulses are generated in operation 606 according to the values set during the initialization. The generated optical recording pulse is as shown in FIG. 4B through 4E.

In operation 607, if it is determined that the recording has not been completed in operation 607, operation 606 is performed again so that the optical recording pulse can be generated according to the set conditions. However, if it is determined that the recording has completed in operation 607, the recording mode is changed to the reproduction mode in operation 608.

The present invention generates optical recording pulses where multi-pulses have one pulse width or at least two different pulse widths within the multi-pulse chain depending on the type of the optical media, the recording speed, or the CAV recording process. Then, the configuration of the domain created on the optical media will be nearly close to that of the ideal domain. Jitter will be reduced and cross erasure between adjacent tracks, which may be caused by the domain configuration, will be prevented in any high-density, high-speed recording environments. In addition, cross-talk between adjacent tracks, which may be generated due to the domain configuration during reproduction, can be prevented.

Although a few preferred embodiments of the present invention have been shown and described, it would be appreciated by those skilled in the art that changes are made in this embodiment without departing from the principles and spirit of the invention, the scope of which is defined in the claims and equivalents.

What is claimed is:

1. An apparatus for generating an optical recording pulse having a first pulse, a multi-pulse chain, and a last pulse to form a domain in an optical medium, comprising:
    a recording pulse generator generating said optical recording pulse; and
    a controller controlling said recording pulse generator so that according to a type of said optical medium or a recording speed of said optical medium, said multi-pulse chain has a plurality of pulses, with at least two different width sets, with at least one width set comprising more than one equal width pulse, used to create a mark.

2. The apparatus of claim 1, wherein said controller determines whether said plurality of pulses having said two different widths should exist in said multi-pulse chain of said optical recording pulse.

3. The apparatus of claim 1, wherein said controller determines each width of respective pulses of said multi-pulse chain when a constant angular velocity recording method has been used in said optical medium.

4. The apparatus of claim 1, wherein said controller determines each width of the pulses of said multi-pulse chain during initialization of said optical medium.

5. The apparatus of claim 1, further comprising a non return to zero inverted (NRZI) data detector detecting the type of NRZI data and controlling said recording pulse generator to generate said optical recording pulse in response to said NRZI data.

6. The apparatus of claim 1, wherein said controller sets said widths of said plurality of pulses of said multi-pulse chain to a fixed value and a variable value less than the fixed value depending on said type of said optical medium or said recording speed of said optical medium.

7. The apparatus of claim 1, wherein said controller sets the widths of the said pulses of said multi-pulse chain to a fixed value and a variable value different from said fixed value.

8. A method of generating an optical recording pulse having a first pulse, a multi-pulse chain, and a last pulse, comprising:
    setting a recording mode for forming a domain on an optical medium;
    depending on a type of said optical medium or a recording speed of said optical medium, generating said multi pulse chain with a plurality of pulses having at least two different width sets, with at least one width set comprising more than one equal width pulse; and
    generating said optical recording pulse having said first pulse, said multi-pulse chain, and said last pulse.

9. The method of claim 8, further comprising determining whether two different width sets of said pulses of said multi-pulse chain or more than two width sets of said pulses of said multi-pulse chain should exist.

10. The method of claim 8, wherein the width of each pulse of said multi-pulse chain is based upon a constant angular velocity (CAV) recording method used for said optical medium.

11. The method of claim 8, wherein said multi-pulse chain is generated during initialization of said recording mode.

12. A method of recording in an optical recoding apparatus, comprising:
    generating an optical recording pulse having a first pulse, a multi-pulse chain, and a last pulse, said multi pulse chain having a plurality of pulses with a plurality of width sets, with at least one width set comprising more than one equal width pulse; and
    forming a domain on an optical medium in accordance with said optical recoding pulse.

13. The method of claim 12, wherein:
    said first pulse has a first width;
    said last pulse has a last width; and
    said multi-pulse chain comprising a plurality of width sets includes a set of second pulses having a second width and a third pulse having a third width, said second and third widths being narrower than the widths of said first pulse and said last pulse.

14. The method of claim 12, wherein:
    said first pulse has a first width; and p1 said multi-pulse chain comprising a plurality of width sets includes a set of second pulses each having a second width and another set of third pulses each having a third width different from said second width.

15. The method of claim 12, wherein said multi-pulse chain comprises three width sets of pulses each set having a second width, a third width, and a fourth width, respectively, which are different from each other.

16. The method of claim 15, wherein said second, third, and fourth widths are narrower than that of said first pulse and said last pulse.

17. The method of claim 12, wherein one of said pulses of said multi-pulse chain has a width greater than that of one of said first pulse and said last pulse.

18. The method of claim 12, wherein one of said pulses of said multi-pulse chain has a width narrower than that of one of said first pulse and said last pulse while a second one of said pulses is wider than one of said first pulse and said second pulse.

19. The method of claim 12, wherein said multi-pulse chain comprises first and second width sets of said pulses, said first width set of pulses having a first width greater than that of said second width set of said pulses, said first width set of said pulses following said first pulse while said second width set of said pulses are followed by said last pulse.

20. The method of claim 12, further comprising:
    receiving information representing a first length of a first domain and a second length of a second domain, said first length being greater than said second length;
    generating said multi-pulse chain when said information represents said first length; and
    generating a second multi-pulse chain when said information represents said second length.

21. The method of claim 12, further comprising:
    receiving information representing one of a first type of said optical medium and a second type of said optical medium;
    generating said multi-pulse chain when said information represents said first type; and
    generating a second multi-pulse chain when said information represents said second type.

22. The method of claim 12, further comprising:
    receiving information representing a constant angular velocity (CAV) recording process;
    generating said multi-pulse chain when said information represents said CAV recording process; and
    generating a second multi-pulse chain when said information does not represent said CAV recording process.

23. A method for recording in an optical recording apparatus, comprising:
    generating an optical recording pulse having a first pulse having a first width, a multi-pulse chain having a plurality of pulses, and a last pulse having a last width;

forming a domain on an optical medium in accordance with said optical recording pulse;

receiving information corresponding to a length of a domain; and changing at least one of said pulses of said multi-pulse chain to have sets of pulses with at least two different width sets, with one width set comprising more than one equal width pulse in response to said length of said domain.

24. The method of claim 23, wherein said one width set is greater than that of one of said first pulse and said last pulse.

25. The method of claim 23, wherein said one width set is less than that of said one of said multi-pulse chain, said first pulse, and said last pulse.

26. A method for recording in an optical recording apparatus, comprising:

determining a length of a domain on an optical medium; and preparing a recording pulse including first pulse width set having a first width, a multi-pulse chain having a second pulse width set having a second width and a third pulse width set having a third width, and a last pulse having a last width in order, said second width of said second pulse width set being different from said third width of said third pulse width set, said recording pulse corresponding to the length of a domain which is formed on the optical medium, wherein at least one of said second pulse width set and said third pulse width set comprises more than one equal width pulse.

27. The method of claim 26, further comprising generating said recording pulse in response to said length of said domain greater than a minimum length.

28. The method of claim 26, further comprising generating a second recording pulse including said first pulse, a second multi-pulse chain having a fourth pulse width set with a fourth width different from one of said second width of said second pulse width set and said third width of said third pulse width set, and said last pulse in order in response to said length of said domain less than a reference.

29. The method of claim 26, further comprising preparing a second recording pulse including said first pulse, a second multi-pulse chain having a fourth pulse width set with a fourth width less than said second and third widths, and said last pulse in order, said second recording pulse width set corresponding to a second length of a second domain which is formed on said optical medium, wherein said second length of said second domain is less than said length of said domain.

30. A method for forming a domain on an optical medium, corn prising:

preparing a first recording pulse including a first pulse having a first width, a multi-pulse chain having at least two pulses with a second width in a second pulse width set and a third width in a third pulse width set different from said second width, and a last pulse having a last width in order, wherein at least one of said second pulse width set and said third pulse width set comprises more than one equal width pulse;

preparing a second recording pulse including a second multi-pulse chain having a fourth pulse width set with a fourth width different from one of said second and third widths, and a second last pulse in order;

generating said first recording pulse in response to a length of said domain greater than a reference; and generating said second recording pulse in response to said length of said domain less than said reference.

31. The method of claim 30, wherein said domain represents a non-return to zero inverted data to be recorded on said optical medium.

32. A method for forming a domain on an optical medium, comprising:

preparing a first recording pulse including first pulse having a first width, a multi-pulse chain having at least two pulses of a second pulse width set where each second pulse has a second width, a third pulse width set having a third width, and a fourth pulse width set having a fourth width, and a last pulse having a last width in order, said second width of said second pulse width set different from said third and fourth widths; and generating said recording pulse when a constant angular velocity recording process is used for said optical medium.

33. The method of claim 32, further comprising:

preparing a second recording pulse including a second first pulse, a second multi-pulse chain having a fifth pulse width set having a fifth width and a sixth pulse width set with a sixth width, and a second last pulse in order; and generating said second recording pulse when said constant angular velocity recording process is not used for said optical medium.

34. A method for forming a domain on an optical medium, comprising the operations of:

preparing a first recording pulse including first pulse width set having a first width, a multi-pulse chain having at least two pulses of a second pulse width set where each second pulse has a second width, a third pulse width set having a third width, and a fourth pulse width set having a fourth width, and a last pulse having a last width in order, said second, third, and fourth widths being different from each other; and generating said recording pulse in response to either one of a length of said domain and a recording speed of said domain for forming said domain representing data to be recorded on said optical medium.

35. The method of claim 34, wherein said recording speed represents a constant angular velocity recording process.

36. The method of claim 34, wherein said length of said domain is greater than a minimum length formed on said optical medium.

37. The method of claim 34, wherein said length of said domain represents non-return to zero inverted data.

38. A method for forming a domain on an optical medium, comprising:

preparing a first recording pulse including first pulse width set having a first width, a multi-pulse chain having a second pulse width set having a second width and a third pulse width set having a third width, and a last pulse having a last width in order, said second width of said second pulse width set different from said third width of said third pulse width set, wherein at least one of said second pulse width set and said third pulse width set comprises more than one equal width pulse; and generating said recording pulse in response to either one of a length of said domain and a recording speed of said domain for forming said domain representing data to be recorded on said optical medium.

39. The method of claim 38, further comprising the operations of:
  providing a fourth pulse width set having a fourth width;
  generating a second recording pulse having said fourth pulse width set inserted into said multi-pulse chain when said domain is formed on an outside area of said optical medium while said recording pulse not having said fourth pulse width set is generated when said domain is formed on an inside area of said optical area, wherein said outside area is greater than said inside area in diameter.

40. The method of claim 38, wherein said first pulse, said multi-pulse chain, and said last pulse have the same height.

41. An apparatus for generating an optical recording pulse for forming a domain on an optical medium, comprising:
  a recording pulse generator generating said optical recording pulse having a first pulse, a multi-pulse chain having a second pulse width set with a second width, and a last pulse in response to non-return to zero inverted data; and
  a controller controlling said recording pulse generator to generate a third pulse width set with a third width different from said second width of said second pulse width set of said multi-pulse chain, said third pulse width set inserted into said multi-pulse chain of said optical recording, pulse, wherein at least one of said second pulse width set and said third pulse width set comprises more than one equal pulse width.

42. The apparatus of claim 41, wherein said controller controls said recording pulse generator to insert said third pulse width set between said second pulse width set and said last pulse.

43. The apparatus of claim 41, wherein said controller controls said recording pulse generator to insert said third pulse width set between said first pulse and said second pulse width set.

44. The apparatus of claim 41, said controller receiving from said optical medium information relating to one of a recording type of said optical medium and a recording speed of said optical medium, and said controller controlling said recording pulse generator to generate said multi-pulse chain in response to said information.

45. The apparatus of claim 41, wherein said controller controls said recording pulse generator to generate said multi-pulse chain when a constant angular velocity recording method is used for said optical medium.

46. The apparatus of claim 41, wherein said controller controls said recording pulse generator to generate said multi-pulse chain when a length of said domain is greater than a reference.

47. The apparatus of claim 41, wherein said controller controlling said recording pulse generator to generate said multi-pulse chain when said domain is formed on an outside area of said optical medium while said multi-pulse chain is not generated when said domain is formed on an inside area of said optical medium.

\* \* \* \* \*

UNITED STATES PATENT AND TRADEMARK OFFICE
CERTIFICATE OF CORRECTION

PATENT NO. : 7,050,375 B2
APPLICATION NO. : 10/076561
DATED : May 23, 2006
INVENTOR(S) : Jin-Gyo Seo

It is certified that error appears in the above-identified patent and that said Letters Patent is hereby corrected as shown below:

Title Page, item [54] (Title), Line 3, after "PULSE" insert --INCLUDING A MULTIPULSE--.

Title Page, item [75] (Inventor), Line 1, change "Geo," to --Seo,--.

Title Page, item [56] (U.S. Patent Documents), Line 2, change "B1" to --B2--.

Column 7, Line 45-46, change "multi pulse" to --multi-pulse--.

Column 7, Line 64, change "multi pulse" to --multi-pulse--.

Column 8, Line 12, after "and" delete "p1".

Column 9, line 51, change "corn prising:" to --comprising--.

Signed and Sealed this

Twenty-first Day of November, 2006

JON W. DUDAS
*Director of the United States Patent and Trademark Office*